United States Patent
Hartnagel et al.

(10) Patent No.: US 11,364,553 B2
(45) Date of Patent: Jun. 21, 2022

(54) SYSTEMS AND METHODS FOR FORMING TAPERED HOLES IN WORKPIECES

(71) Applicant: THE BOEING COMPANY, Chicago, IL (US)

(72) Inventors: Trevor Hartnagel, Highland, IL (US); Kip Ryan Kuldell, St. Charles, MO (US); Joseph A. Kaufman, St. Charles, MO (US); James A. Hammond, Jr., O'Fallon, MO (US); Christian E. Schaefer, Cottleville, MO (US); Russell DeVlieg, Woodinville, WA (US); Patrick Dunn, Everett, WA (US)

(73) Assignee: THE BOEING COMPANY

( * ) Notice: Subject to any disclaimer, the term of this patent is extended or adjusted under 35 U.S.C. 154(b) by 145 days.

(21) Appl. No.: 16/820,761

(22) Filed: Mar. 17, 2020

(65) Prior Publication Data

US 2021/0291281 A1   Sep. 23, 2021

(51) Int. Cl.
*B23B 51/00* (2006.01)
*B23B 35/00* (2006.01)
(Continued)

(52) U.S. Cl.
CPC .......... *B23B 51/0018* (2013.01); *B23B 35/00* (2013.01); *B25J 11/0055* (2013.01);
(Continued)

(58) Field of Classification Search
CPC ..... B25J 11/0055; B25J 11/005; B23B 39/24; B23B 39/16; B23B 51/0018; B23B 51/06;
(Continued)

(56) References Cited

U.S. PATENT DOCUMENTS 5,259,104 A * 11/1993 Givler ...................... B21J 15/10
29/426.5
5,458,443 A   10/1995 Beige
(Continued)

FOREIGN PATENT DOCUMENTS

EP          2101937        9/2009
WO    WO 2008/068595   12/2008

OTHER PUBLICATIONS

Extended European Search Report for EP 21162673.4-1016, dated Sep. 10, 2021.

*Primary Examiner* — Chwen-Wei Su
(74) *Attorney, Agent, or Firm* — The Small Patent Law Group LLC; Joseph M. Butscher

(57) ABSTRACT

A robotic forming system and method for forming a tapered hole in a workpiece include a housing and a nose extending from the housing. The housing defines an internal chamber. A vacuum gate is in fluid communication with an internal cavity of the nose. A seal is within the nose. A first spindle includes a first operative head. The first spindle is retained within the internal chamber. The first spindle is configured to be moved between a first stowed position within the housing and a first operating position in which the first operative head extends into the nose. The first operative head is configured to form an initial hole within the workpiece. A second spindle includes a second operative head. The second spindle is retained within the internal chamber. The second spindle is configured to be moved between a second stowed position within the housing and a second operating position in which the second operative head extends into the nose. The second operative head is configured to modify the initial hole to form a tapered hole.

23 Claims, 8 Drawing Sheets

(51) Int. Cl.
*B25J 11/00* (2006.01)
*B23Q 11/00* (2006.01)
*B23B 51/06* (2006.01)

(52) U.S. Cl.
CPC ......... *B23B 51/06* (2013.01); *B23B 2260/126* (2013.01); *B23Q 11/0042* (2013.01); *B23Q 11/0046* (2013.01)

(58) Field of Classification Search
CPC ... B23B 51/10; B23B 51/102; B23B 2215/04; B23B 2260/126; B23B 35/00; B23Q 11/0042; B23Q 11/0046; B23Q 11/12; Y10T 408/3839; Y10T 408/5623; Y10T 408/5653
See application file for complete search history.

(56) References Cited

U.S. PATENT DOCUMENTS

| | | | |
|---|---|---|---|
| 6,394,940 B1 * | 5/2002 | Sugata | B23Q 11/0046 408/61 |
| 6,949,057 B2 * | 9/2005 | Everson | B23Q 3/15513 29/34 B |
| 7,073,989 B2 * | 7/2006 | Erickson | B23B 45/003 408/112 |
| 9,708,079 B2 * | 7/2017 | DesJardien | B25J 9/0018 |
| 9,937,599 B1 * | 4/2018 | Holleman | B23Q 11/0046 |
| 10,702,929 B2 * | 7/2020 | Hirai | B23B 39/24 |
| 2015/0314888 A1 | 11/2015 | Reid | |

\* cited by examiner

SYSTEMS AND METHODS FOR FORMING TAPERED HOLES IN WORKPIECES

FIELD OF THE DISCLOSURE

Embodiments of the present disclosure generally relate to systems and methods for forming tapered holes in workpieces.

BACKGROUND OF THE DISCLOSURE

Various structures are formed of metals. For example, portions of aircraft are formed of aluminum, titanium, and the like. Tapered holes are formed through portions of the structures.

Certain components formed of titanium, for example, have holes that are formed through drilling and reaming processes. The tapered hole formed through a titanium component reduces fatigue and facilitates uniform load distribution. In forming the tapered hole, additional material is removed from the resulting hole as compared to if the hole was simply cylindrical. When additional material is removed from a tapered hole, adequate application of both cooling air and lubrication to the cutting tool is typically required.

The process of forming tapered holes is particularly difficult for hard metals, such as titanium. As tapered holes are drilled within such metals, relatively high levels of friction and heat are generated. The friction and heat may degrade the operating head (such as that of a drill), thereby reducing its useful life.

Traditionally, large drill plates are used to locate holes that are to be formed in workpieces and support drilling tools. An individual mounts relatively large power feed drill tools on the drill plates. Typically, a first drill tool is used to form a pre-drilled hole, and then a second separate and distinct drill tool is used to form a tapered ream in the hole. As such, one or more individuals manipulate, mount, and operate the different drilling tools with respect to the drill plates.

Moreover, operating the different drilling tools is often not easy, and may differ based on incoming air pressure. Highly skilled technicians are often required to set up and operate the different drill tools. Further, individuals may find that lifting and moving drill plates and heavy drill tools is ergonomically challenging.

As can be appreciated, the process of manually configuring and manipulating complex drilling tools to form tapered holes through certain structures is time and labor intensive, as well as ergonomically awkward.

SUMMARY OF THE DISCLOSURE

A need exists for an efficient and effective system and method of forming tapered holes through structures. Further, a need exists for an automatic system and method of forming tapered holes through structures. Additionally, a need exists for an automatic system and method that provides pressure to more forcefully force air and lubricant through a tapered hole during formation of the tapered hole (compared to conventional systems for forming tapered holes). Also, a need exists for a system and method that extend the life an operating head (such as that of a drill) that is used to form tapered holes in metals.

With those needs in mind, certain embodiments of the present disclosure provide a robotic forming system for forming a tapered hole in a workpiece. The robotic forming system includes an end effector including a housing and a nose extending from the housing. The housing defines an internal chamber. A first spindle includes a first operative head. The first spindle is retained within the internal chamber. The first spindle is configured to be moved between a first stowed position within the housing and a first operating position in which the first operative head extends into the nose. The first operative head is configured to form an initial hole within the workpiece. A second spindle includes a second operative head. The second spindle is retained within the internal chamber. The second spindle is configured to be moved between a second stowed position within the housing and a second operating position in which the second operative head extends into the nose. The second operative head is configured to modify the initial hole to form a tapered hole.

In at least one embodiment, a third spindle includes a third operative head. The third spindle is retained within the internal chamber. The third spindle is configured to be moved between a third stowed position within the housing and a third operating position in which the third operative head extends into the nose. The third operative head is configured to form a countersink or a counterbore in the tapered hole.

In at least one embodiment, the robotic forming system includes one or more arms. The end effector is coupled to the one or more arms. One or more actuators are operatively coupled to one or both of the one or more arms or the end effector.

In at least one embodiment, a vacuum gate is in fluid communication with an internal cavity of the nose. A vacuum generator is coupled to the vacuum gate. A valve is disposed within the vacuum gate. The valve is configured to be selectively moved between an open position that allows for fluid communication with the vacuum generator, and a closed position that prevents fluid communication with the vacuum generator.

In at least one embodiment, the vacuum generator is activated, and the valve is in the open position when the first operative head is in the first operating position. Lubricant and debris are drawn to the vacuum generator through the vacuum gate when the valve is in the open position. The valve is in the closed position when the second operative head is in the second operating position. Lubricant and debris are forced out of the internal cavity of the nose and the tapered hole when the valve is in the closed position.

In at least one embodiment, a lubricant dispenser is within the nose. The lubricant dispenser is configured to dispense lubricant onto one or more of the first operative head in the first operating position, the second operative head in the second operating position, the initial hole, or the tapered hole. In at least one embodiment, the lubricant dispenser is positioned at a tip of the nose and is configured to apply lubricant directly to each of the first operative head and the second operative head at an interface between the nose and the hole.

In at least one embodiment, a seal is within the nose. The seal is configured to sealingly engage at least a portion of the first spindle in the first operative position and the second spindle in the second operative position. The seal may include dual shaft seals mounted to an internal wall of the nose.

In at least one embodiment, a control unit is configured to operate the first spindle and the second spindle, for example.

Certain embodiments of the present disclosure provide a robotic forming method for forming a tapered hole in a workpiece. The robotic forming method includes providing an end effector including a housing and a nose extending from the housing, wherein the housing defines an internal chamber; providing a first spindle comprising a first operative head, the first spindle retained within the internal chamber; providing a second spindle comprising a second operative head, the second spindle retained within the internal chamber; moving the first spindle between a first stowed position within the housing and a first operating position in which the first operative head extends into the nose; forming, by the first operative head of the first spindle in the first operating position, an initial hole within the workpiece; moving the second spindle between a second stowed position within the housing and a second operating position in which the second operative head extends into the nose; and modifying, by the second operative head of the second spindle in the second operating position, the initial hole to form a tapered hole.

In at least one embodiment, the robotic forming method also includes providing a third spindle comprising a third operative head, the third spindle retained within the internal chamber; and forming, by the third operative head of the third spindle in a third operating position, a countersink or a counterbore in the tapered hole.

In at least one embodiment, the robotic forming method also includes fluidly coupling a vacuum gate with an internal cavity of the nose; coupling a vacuum generator to the vacuum gate; disposing a valve within the vacuum gate; and selectively moving the valve between an open position that allows for fluid communication with the vacuum generator, and a closed position that prevents fluid communication with the vacuum generator.

In at least one embodiment, the robotic forming method also includes activating the vacuum generator; moving the valve into the open position when the first operative head is in the first operating position; and drawing lubricant and debris to the vacuum generator through the vacuum gate when the valve is in the open position. Further, the robotic forming method includes moving the valve into the closed position when the second operative head is in the second operating position; and forcing lubricant and debris out of the internal cavity of the nose and the tapered hole when the valve is in the closed position.

In at least one embodiment, the robotic forming method also includes providing a lubricant dispenser within the nose; and dispensing, by the lubricant dispenser, lubricant onto one or more of the first operative head in the first operating position, the second operative head in the second operating position, the initial hole, or the tapered hole.

In at least one embodiment, the robotic forming method also includes providing a seal within the nose; and sealingly engaging, by the seal, the first spindle in the first operative position and the second spindle in the second operative position.

Certain embodiments of the present disclosure provide a robotic forming system for forming a tapered hole in a workpiece. The robotic forming system includes an end effector including a housing and a nose extending from the housing. The housing defines an internal chamber. A first spindle includes a first operative head retained within the internal chamber. The first spindle is configured to be moved between a first stowed position within the housing and a first operating position in which the first operative head extends into the nose. The first operative head is configured to form an initial hole within the workpiece. A second spindle includes a second operative head retained within the internal chamber. The second spindle is configured to be moved between a second stowed position within the housing and a second operating position in which the second operative head extends into the nose. The second operative head is configured to modify the initial hole to form a tapered hole. A third spindle includes a third operative head retained within the internal chamber. The third spindle is configured to be moved between a third stowed position within the housing and a third operating position in which the third operative head extends into the nose. The third operative head is configured to form a countersink or a counterbore in the tapered hole. A vacuum gate is in fluid communication with an internal cavity of the nose. A vacuum generator is coupled to the vacuum gate. A valve is disposed within the vacuum gate. The valve is configured to be selectively moved between an open position that allows for fluid communication with the vacuum generator, and a closed position that prevents fluid communication with the vacuum generator. A lubricant dispenser is within the nose. The lubricant dispenser is configured to dispense lubricant onto one or more of the first operative head in the first operating position, the second operative head in the second operating position, the third operative head in the third operating position, the initial hole, or the tapered hole. A seal is within the nose. The seal is configured to sealingly engage the first spindle in the first operative position, the second spindle in the second operative position, and the third spindle in the third operative position.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps.

Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a robotic forming system and method for forming a tapered hole in a workpiece. The workpiece may be formed of a metal, such as titanium, aluminum, or the like. The robotic forming system and method automatically form a tapered hole through the workpiece, thereby providing consistent and improved hole formation (as compared to manually forming a tapered hole). The robotic forming system and method eliminates the need for bulky and ergonomically challenging hand tools.

Certain embodiments of the present disclosure provide a robotic system for forming a tapered hole in a workpiece that includes an end effector having a housing and a nose extending from the housing. The nose is configured to abut the workpiece. A plurality of spindles are operatively coupled to the housing. Each spindle includes a main body and an operative head. Each spindle is configured to be moved between a stowed position within the housing, and an operating (for example, cutting and/or drilling) position, in which the operative head is coupled to the nose.

In at least one embodiment, the nose includes an internal cavity through which the operative head of each spindle is configured to traverse. A vacuum gate has a valve that is configured to selectively open and close the vacuum gate. The vacuum gate is in fluid communication with the internal cavity of the nose. A lubricant dispenser is configured to dispense lubricant, such as a mist of lube, out of a distal end of the internal cavity and to cutting edges of a hole in the workpiece. A seal is disposed within the nose and is configured to form a sealing interface between the spindle in the internal cavity and an internal wall of the nose. In at least one embodiment, the seal includes dual shaft seals, which provide redundancy and ensure proper sealing pressure.

Figure 1:
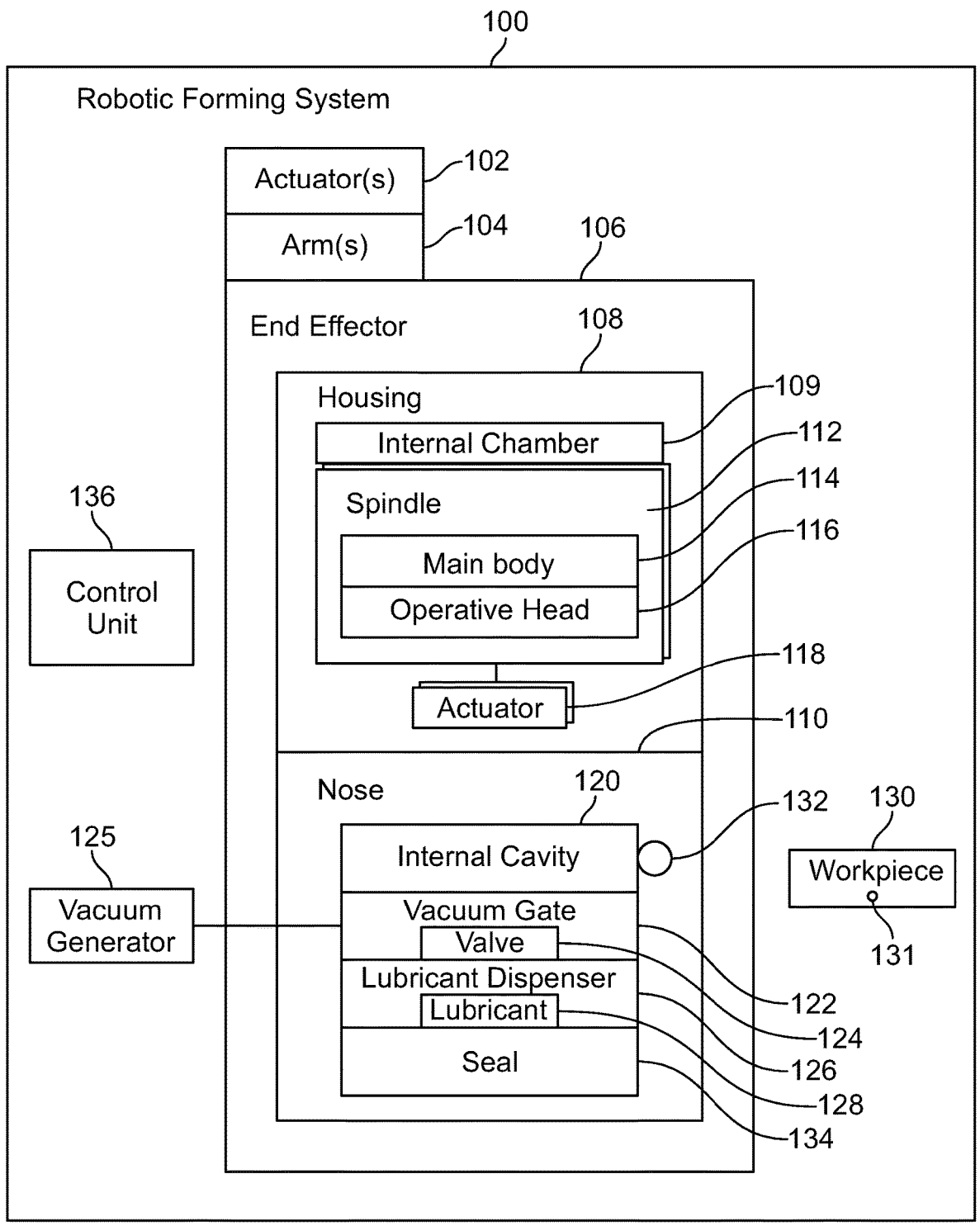
FIG. 1 illustrates a schematic block diagram of a robotic forming system, according to an embodiment of the present disclosure.

FIG. 1 illustrates a schematic block diagram of a robotic forming system 100, according to an embodiment of the present disclosure. The robotic forming system 100 includes one or more actuators 102 operatively coupled to one or more arms 104. The actuator(s) 102 may be electric, hydraulic, pneumatic, or other such motors that are configured to move the arm(s) 104.

An end effector 106 is coupled to a distal end of the arm 104. The end effector 106 includes a housing 108 and a nose 110 extending from the housing 108. The housing 108 defines an internal chamber 109. A plurality of spindles 112 are retained within the housing 108. Each spindle 112 includes a main body 114 and an operative head 116. One or more actuators 118 are operatively coupled to the spindles 112. The actuators 118 may be electric, pneumatic, hydraulic, or other such motors that are configured to move each spindle 112 between a stowed position within the internal chamber 109, and an operating position, in which the operative head 116 extends into and through the nose 110.

In at least one embodiment, the end effector 106 includes three different spindles 112. A first spindle 112 includes a first operative head 116 that is configured to form an initial hole, such as a cylindrical hole. A second spindle 112 includes a second operative head 116 that is configured to form a tapered ream within the initial hole. That is, the second operative head 116 is configured to extend into the initial hole and modify the initial hole to form the tapered ream, thereby forming a tapered hole. A third spindle 112 includes a third operative head 116 that is configured to form a countersink or counterbore in the tapered hole. Alternatively, the end effector 106 may not include the third spindle 112.

The nose 110 includes an internal cavity 120. The operative heads 116 are configured to be moved into the internal cavity 120. The nose 110 also includes a vacuum gate 122 in fluid communication with a vacuum generator 125. The vacuum gate 122 includes a valve 124 that is configured to selectively open and close the vacuum gate 122. The vacuum gate 122 is also in fluid communication with the internal cavity 120.

The nose 110 also includes a lubricant dispenser 126 that is configured to dispense lubricant 128 (such as a mist of lube, oil, or the like) onto each operative head 116 when positioned within the internal cavity 120 and into and/or onto a hole 131 formed in a workpiece 130, such as a piece of metal (for example, titanium). The lubricant dispenser 126 is configured to dispense the lubricant 128 out of an opening 132 at a distal end of the internal cavity 120 and onto cutting edges of the hole 131 formed through the workpiece 130.

The nose 110 also includes a seal 134, such as within the internal cavity 120. The seal 134 is configured to form a seal between the spindles 112 within the internal cavity 120 and an internal wall of the nose 110 that defines the internal cavity 120. In at least one embodiment, the seal 134 includes dual shaft seals mounted to the internal wall of the nose 110. The dual shaft seals contribute to building pressure and prevent blowback during formation of the tapered hole 131' (shown in FIG. 8).

A control unit 136 is configured to control operation of the robotic forming system 100. The control unit 136 may be contained within the end effector 106, for example. In at least one other example, the control unit 136 may be remotely located from the end effector 106. For example, the control unit 136 may be part of a computer workstation that is in communication with various components of the robotic forming system 100, such as through one or more wired or wireless connections.

The control unit 136 is in communication with the one or more actuators 102, such as through one or more wired or wireless connections. The control unit 136 is configured to operate the one or more actuators 102 to operate the one or more arms 104. For example, the control unit 136 operates the actuator 102 to move the end effector 106 in relation to the workpiece 130 so that the nose 110 abuts the workpiece 130.

The control unit 136 is also in communication with the spindles 112 and the actuators 118, such as through one or more wired or wireless connections. The control unit 136 is configured to operate the spindles 112 to selectively move the spindles 112 between stowed positions within the internal chamber 109 and operating positions within the internal cavity 120 of the nose 110. The control unit 136 is further configured to operate the operative heads 116 of the spindles 112 when the spindles 112 are in the operating positions to operate on the workpiece 130, such as to form an initial hole in the workpiece, taper the initial hole to form a tapered hole, and/or to form a countersink or counterbore in relation to the tapered hole.

The control unit 136 is also in communication with the valve 124, the lubricant dispenser 126, and the vacuum generator 125, such as through one or more wired or wireless connections. The control unit 136 is configured to operate the valve 124, the lubricant dispenser 126, and the vacuum generator 125.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 136 can be or include one or more processors that are configured to control operation thereof, as described herein.

The control unit 136 is configured to execute a set of instructions that are stored in one or more data storage units or elements (such as one or more memories), in order to process data. For example, the control unit 136 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the control unit 136 as a processing machine to perform specific operations such as the methods and processes of the various embodiments of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

Example embodiments of the robotic forming system 100 can include one or more control or processing units, such as the control unit 136. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the control unit 136 can represent processing circuitry such as one or more of a field programmable gate array (FPGA), application specific integrated circuit (ASIC), microprocessor(s), and/or the like. The circuits in various embodiments can be configured to execute one or more algorithms to perform functions described herein. The one or more algorithms can include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
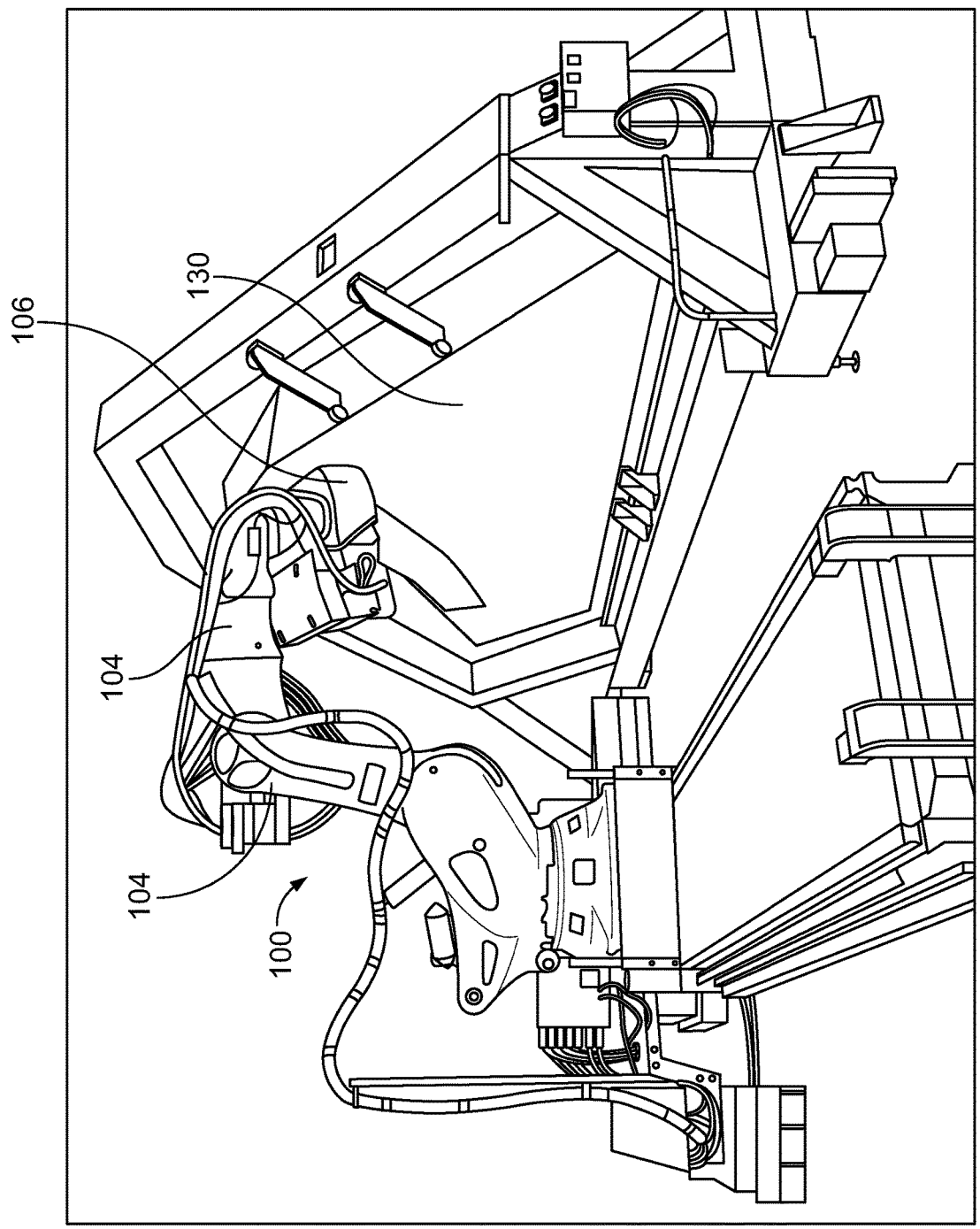
FIG. 2 illustrates a perspective view of the robotic forming system in relation to a workpiece, according to an embodiment of the present disclosure.

FIG. 2 illustrates a perspective view of the robotic forming system 100 in relation to the workpiece 130, according to an embodiment of the present disclosure. As shown, the end effector 106 is operatively coupled to an arm 104, such as an articulating arm, which may, in turn, be operatively coupled to one or more additional arms 104.

The workpiece 130 may be formed of metal, such as titanium. The workpiece 130 may be configured to form part of an aircraft, such as a wing. The robotic forming system 100 is configured to form one or more tapered holes through the workpiece 130, as described herein.

Referring to FIGS. 1 and 2, in at least one embodiment, the control unit 136 operates the arm(s) 104 to move the end effector 106 into close proximity of the workpiece 130. For example, the nose 110 is moved onto the workpiece 130 so as to abut an area where a tapered hole is to be formed. The end effector 106 may be clamped onto the workpiece 130.

Figure 3:
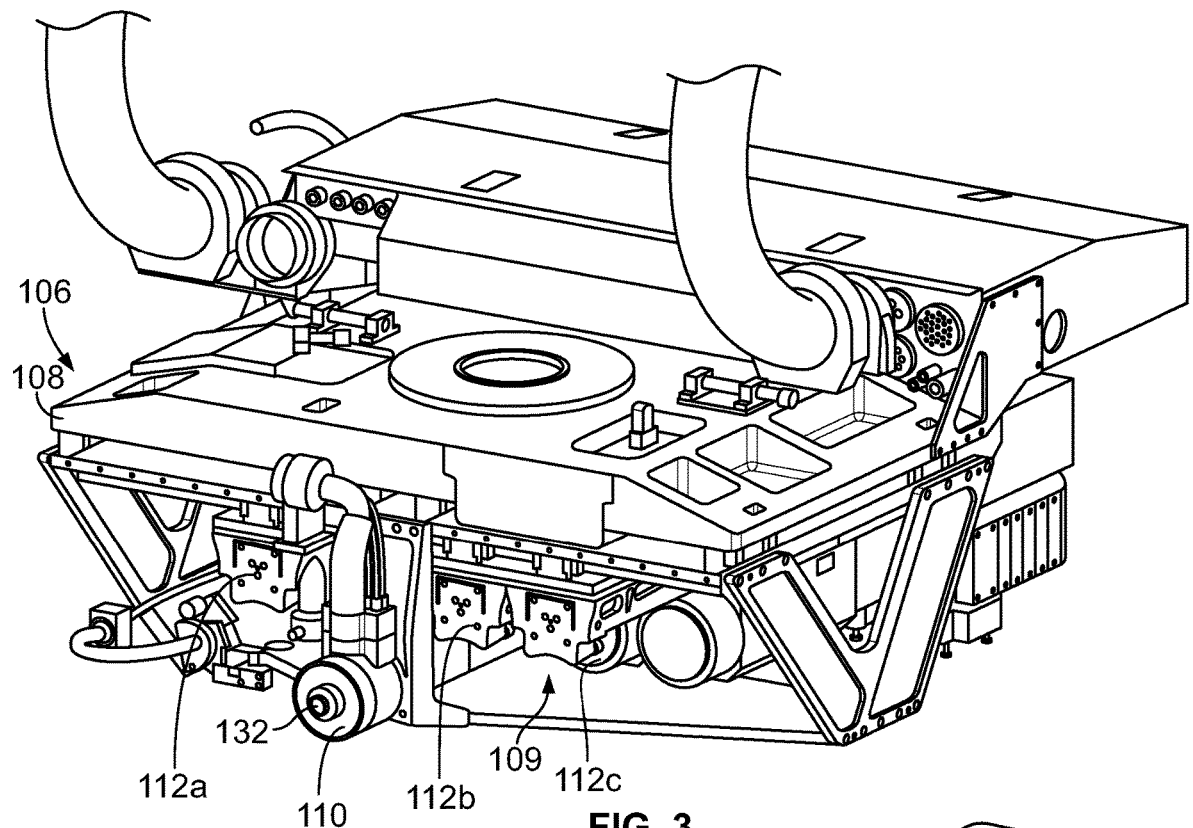
FIG. 3 illustrates a perspective front view of an end effector, according to an embodiment of the present disclosure.

FIG. 3 illustrates a perspective front view of the end effector 106, according to an embodiment of the present disclosure. Referring to FIGS. 1 and 3, the spindles 112 are retained within the internal chamber 109 of the housing 108. The spindles 112 are configured to be selectively moved between stowed positions within the internal chamber 109, and operating positions in which the operative heads 116 extend into and/or through the opening 132 of the nose 110. In the example illustrated in FIG. 3, the end effector 106 includes three spindles 112. In particular, the end effector 106 includes a first spindle 112a, a second spindle 112b, and a third spindle 112c.

Figure 4:
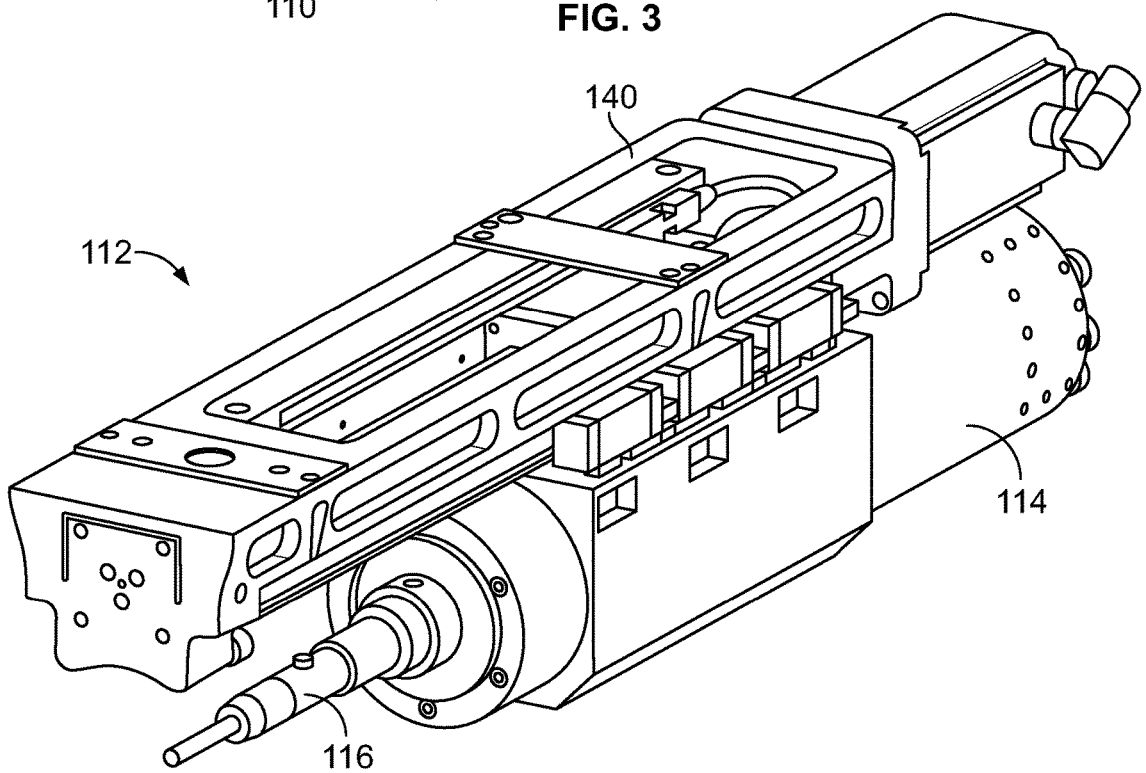
FIG. 4 illustrates a perspective front view of a spindle, according to an embodiment of the present disclosure.

FIG. 4 illustrates a perspective front view of a spindle 112, according to an embodiment of the present disclosure. Referring to FIGS. 1 and 4, the spindle 112 includes the main body 114 and the operative head 116 extending from the main body 114. The main body 114 includes or may be coupled to a shuttle 140 (such as a bracket, beam, panel, and/or the like) that is configured to be moveably coupled to rails, tracks, or the like within the internal chamber 109 of the housing 108.

In at least one embodiment, the housing 108 retains three different spindles 112. A first spindle 112 includes a first operative head 116 that is configured to form an initial hole, such as an undersized cylindrical hole. A second spindle 112 includes a second operative head 116 that differs from the first operative head 116. The second spindle 112 is configured to form a tapered ream within the initial hole, thereby expanding and tapering the initial hole to form a tapered hole. A third spindle 112 includes a third operative head 116 that differs from the first operative head 116 and the second operative head 116. The third operative head 116 is configured to form a countersink 135 (shown in FIG. 8) or counterbore within the tapered hole.

Figure 5:
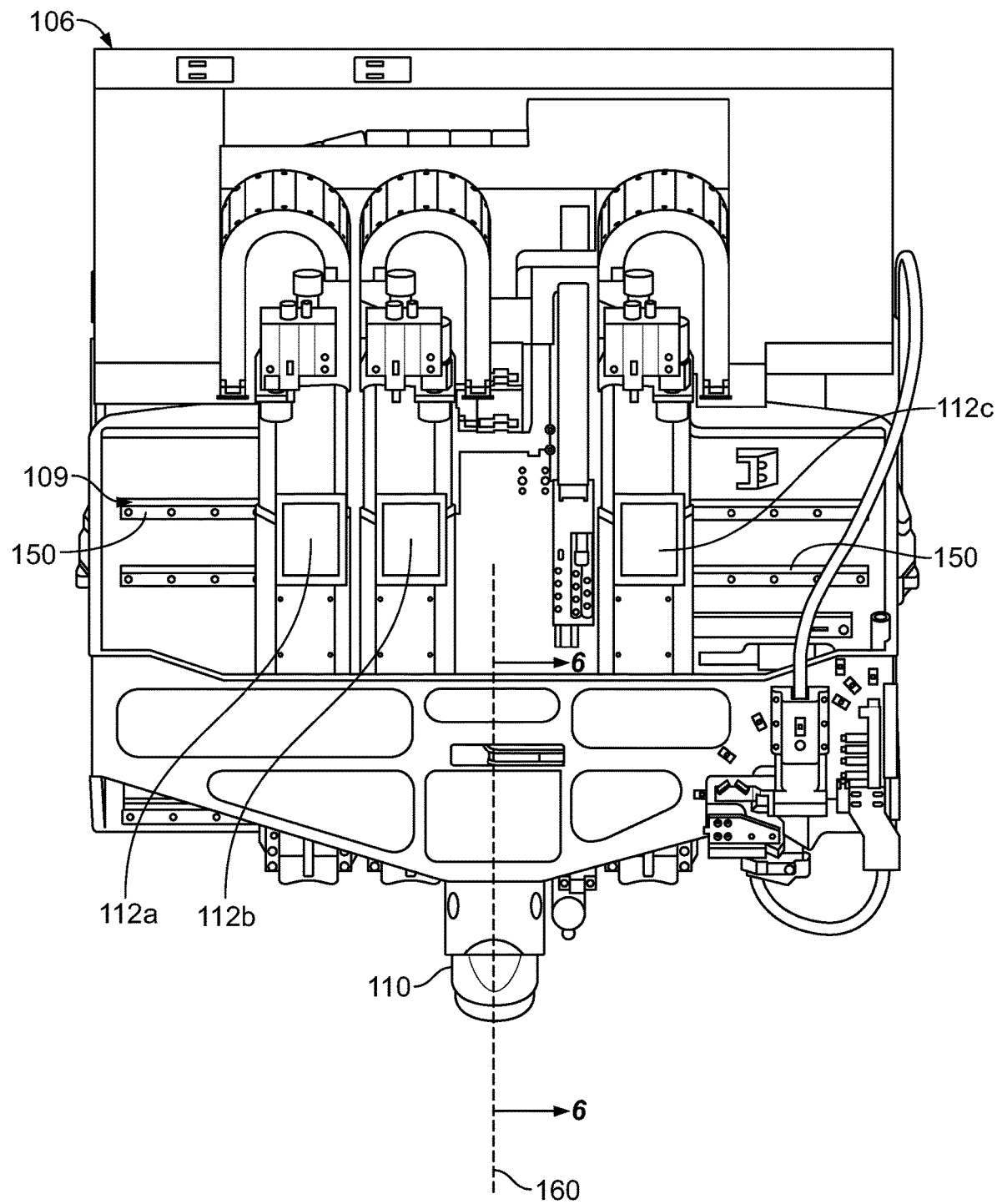
FIG. 5 illustrates a top view of the end effector, according to an embodiment of the present disclosure.

FIG. 5 illustrates a top view of the end effector 106, according to an embodiment of the present disclosure. Referring to FIGS. 1 and 5, the spindles 112a, 112b, and 112c are retained within stowed positions within the internal chamber 109. The spindle 112a is configured to form an initial hole in the workpiece 130. The spindle 112b is configured to modify the initial hole to form a tapered hole. The spindle 112c is configured to form a countersink 135 (shown in FIG. 8) or counterbore in the tapered hole.

Each spindle 112a, 112b, and 112c is moveably coupled within the internal chamber 109. For example, the main bodies 114 are moveably coupled to one or more tracks or rails 150 within the internal chamber 109. The control unit 136 operates the actuators 118 to linearly move the spindles 112a, 112b, and 112c over the rails 150. Optionally, the spindles 112a, 112b, and 112c may be configured to move in a rotary fashion with respect to the rails 150.

In operation, after the end effector 106 is moved in relation to the workpiece 130 so that the nose 110 abuts against a surface of the workpiece 130 in which the hole 131 is to be formed, the control unit 136 operates the actuators 118 to move the spindle 112a into alignment with the nose 110. For example, the spindle 112a is moved so that it is longitudinally aligned with a longitudinal axis 160 of the nose 110. After the spindle 112a is aligned with the nose 110, the control unit 136 operates the actuators 118 to move the spindle 112a into the operating position, in which the operative head 116 is moved into the internal cavity 120 of the nose 110. For example, the main body 114 may be urged into the internal cavity 120 so that the operative head 116 extends into and/or through the opening 132 of the nose 110. The control unit 136 then operates the operative head of the spindle 112a to form the initial hole through the workpiece 130.

After the initial hole is formed, the control unit 136 moves the spindle 112a out of the internal cavity 120 of the nose 110 and moves the spindle 112a back to a stowed position within the internal chamber 109 of the housing 108. Subsequently, the control unit 136 moves the second spindle 112b into the operating position. In the operating position, the control unit 136 operates the second spindle 112b to modify the initial hole to form the tapered hole. After the tapered hole is formed, the control unit 136 moves the spindle 112b back to a stowed position within the internal chamber 109.

Optionally, the control unit 136 may subsequently move the third spindle 112c into the operating position. The control unit 136 may operate the third spindle 112c in the operating position to form a countersink or counterbore in the tapered hole. Alternatively, the spindle 112c may not be used to form a countersink or counterbore in the tapered hole.

As described herein, the different spindles 112a, 112b, and 112c are selectively moved between stowed positions within the internal chamber 109 of the housing 108 and operating positions in which the respective operative heads 116 extend into the internal cavity 120 of the nose 110. In the operating positions, the operative heads 116 are able to operate on the workpiece. For example, the operative head 116 of the first spindle 112a forms the initial hole 131 through the workpiece 130, the operative head 116 of the second spindle 112b modifies the initial hole 131 to form the tapered hole 131' (shown in FIG. 8), and the operative head 116 of the third spindle 112c forms a countersink 135 (shown in FIG. 8) or counterbore within the tapered hole 131'.

Figure 6:
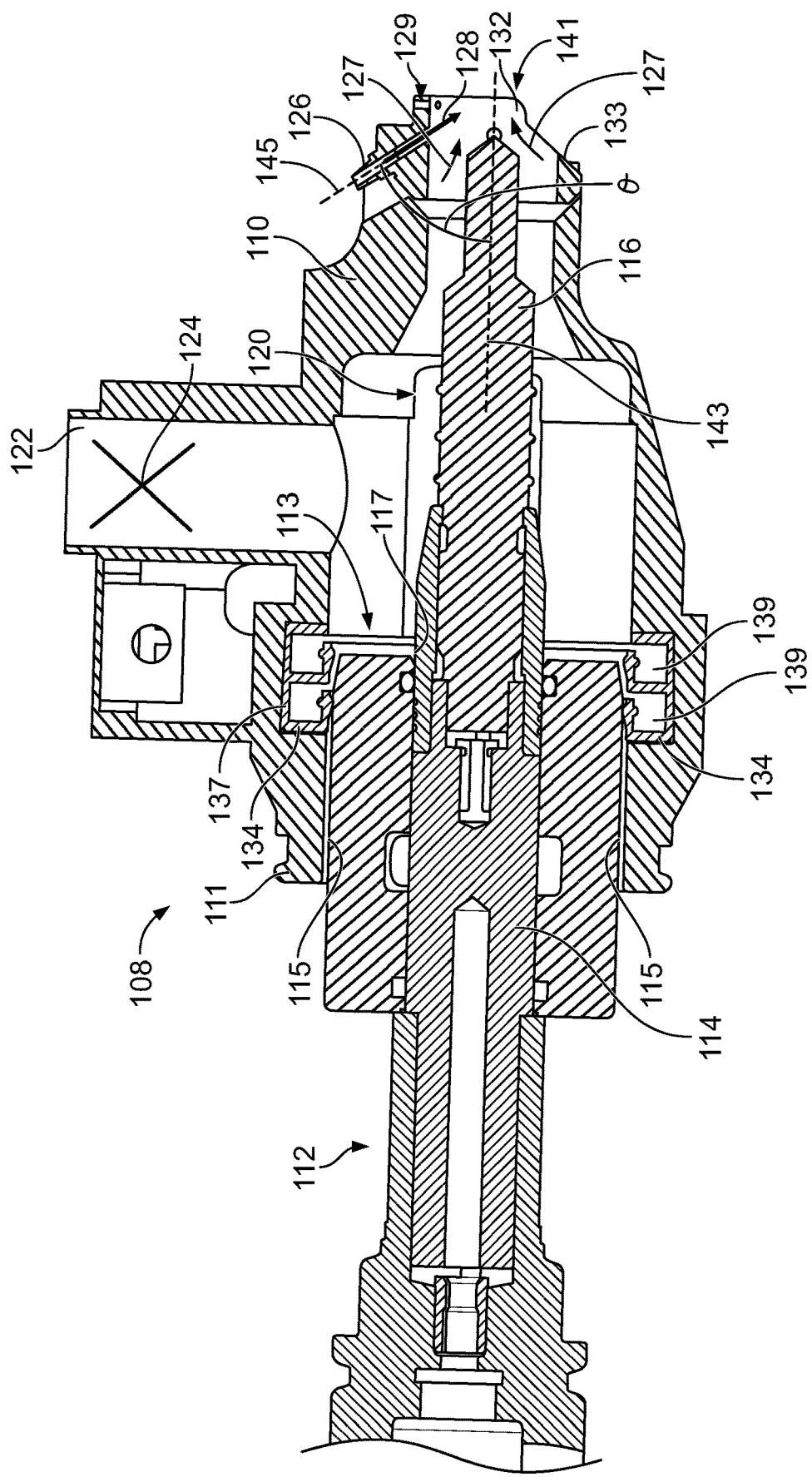
FIG. 6 illustrates a cross-sectional view of a nose of the end effector through line 6-6 of FIG. 5.

FIG. 6 illustrates a cross-sectional view of the nose 110 of the end effector 106 through line 6-6 of FIG. 5. Referring to FIGS. 1 and 6, a spindle 112 is shown in the operating position, such that the operative head 116 extends through the internal cavity 120.

During operation, the lubricant dispenser 126 may be operated to dispense lubricant, such as in mist form, onto the operative head 116 and the workpiece 130. The lubricant dispenser 126 may be disposed proximate a distal end 133 of the nose 110.

In at least one embodiment, the lubricant dispenser 126 is positioned at a tip 129 of the nose 110 and is configured to apply the lubricant 128 directly to the operative head 116 at an interface 141 between the nose 110 and the hole 131. Further, the lubricant dispenser 126 may be angled in relation to a longitudinal axis 143 of the nose 110. That is, the longitudinal axis 145 of the lubricant dispenser 126 may not be parallel to the longitudinal axis 143 of the nose 110. In at least one embodiment, the angle θ between the longitudinal axis 143 and the longitudinal axis is forty-five degrees. Optionally, the angle θ may be greater or less than forty-five degrees. For example, the angle θ may be between twenty and sixty degrees.

The vacuum gate 122 (such as a tubular port, conduit, or the like) is in fluid communication with the vacuum generator 125. When the vacuum generator 125 is activated and the valve 124 is in the open position, lubricant 128 and debris (such as caused by drilling processes) is drawn through the vacuum gate 122 and into the vacuum generator 125. When the valve 124 is in the closed position, the lubricant 128 and debris is not drawn to the vacuum generator 125. Instead, pressure builds within the internal cavity 120, thereby forcing the lubricant 128 and debris out through the opening 132 of the nose 110.

The seal 134 is coupled to the internal wall 137 of the nose 110. The seal 134 sealingly engages an outer surface 115 of the main body 114, thereby preventing fluid infiltration therebetween. For example, the seal 134 directly engages a sleeve or baffle of the main body 114. The sealing interface between the seal 134 and the main body 114 ensures that fluid does not retreat back through the spindle 112. Further, the seal 134 is configured to provide a desired fluid pressure within the internal cavity 120 when the valve 124 of the vacuum gate 122 is in the closed position, in order to ensure that lubricant 128 and debris within the internal cavity 120 and the hole 131 formed through the workpiece 130 is expelled out of the hole 131. For example, the internal fluid pressure within the internal cavity 120 when the valve 124 is closed may be between 5-20 pounds per square inch.

In at least one embodiment, the seal 134 includes dual shaft seals 139. For example, two coaxial seals 139 (such as gaskets, O-rings, or the like) may be positioned on the internal wall 137 and sealingly engage the main body 114 of the spindle 112. The dual shaft seals 139 may be annular seals that circumferentially extend around a portion of the main body 114 when the spindle 112 is in the operating position. The dual shaft seals 139 provide redundancy, thereby ensuring desired operation even if one of the seals 139 wears down. Further, the dual shaft seals 139 are configured to provide a desired internal fluid pressure when the valve 124 is in the closed position. Alternatively, the seal 134 may include only one shaft seal 139. The dual shaft seals 139 contribute to building pressure and prevent blowback during formation of the tapered hole 131' (shown in FIG. 8). In particular, the dual shaft seals 139 contribute to building pressure and ensure that air and coolant are force out of a single exit point (namely, the hole 131), and prevent air and coolant from escaping at other points. The dual shaft seals 139 help the robotic forming system 100 force cooling air and process lubrication to reamer flutes and into the hole 131.

As shown, the dual shaft seals 139 may be between located proximate a fore end 117 of the main body 114. The dual shaft seals 139 may be disposed between the main body 114 and a receiving portion 111 of the housing 108. The receiving portion 111 includes a spindle passage 113 that receives the spindle 112. The dual shaft seals 139 provide a sealing interface between the main body 114 and the receiving portion 111.

The seal 134 is configured to assist in building fluid pressure within the internal cavity 120 of the nose 110. The fluid pressure pushes cooling air 127 and lubricant 128 out of the internal cavity 120 and the hole 131 to clear both of debris and excess lubricant. Further, in addition to providing cooling, the cooling air 127 helps to keep the reamer flute of the operating head 116 of spindle 112b clear of debris, as shown FIG. 8, thereby helping improve the formation of the tapered hole.

Figure 7:
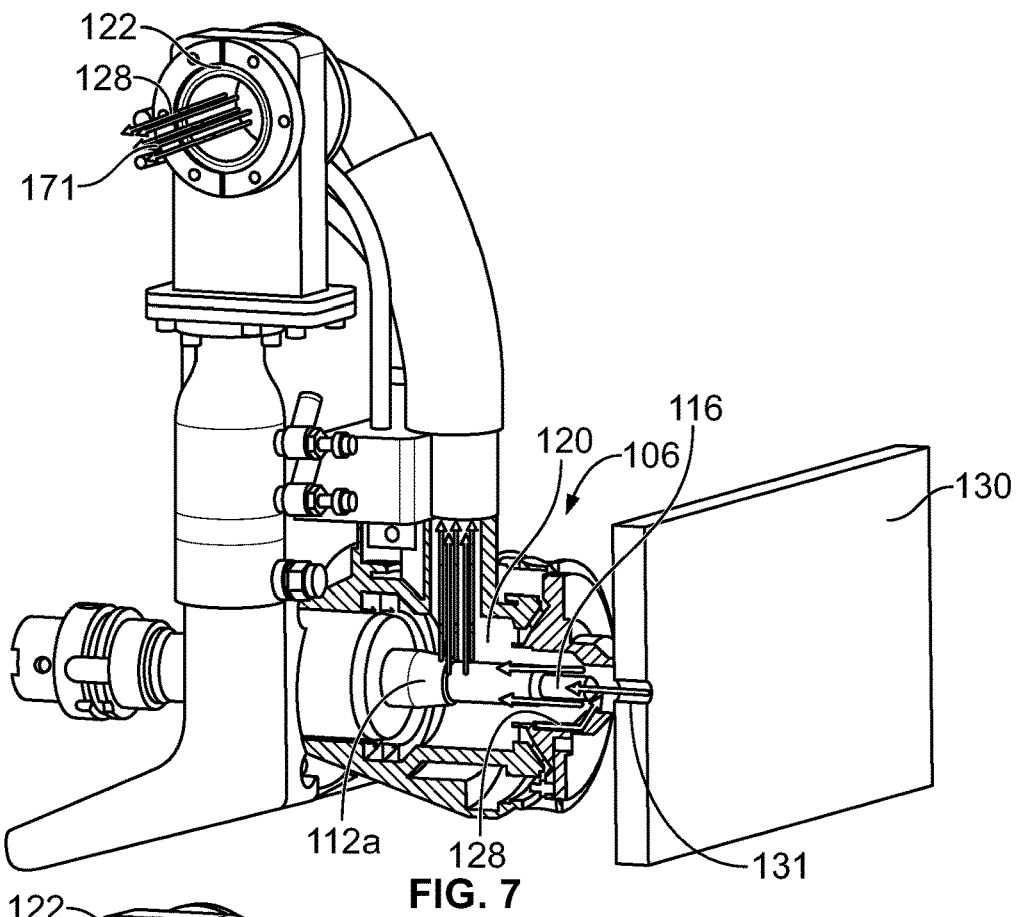
FIG. 7 illustrates a perspective, partial cross-sectional view of the end effector having a first spindle in an operating position, according to an embodiment of the present disclosure.

FIG. 7 illustrates a perspective, partial cross-sectional view of the end effector 106 having the first spindle 112a in an operating position, according to an embodiment of the present disclosure. Referring to FIGS. 1 and 7, the first spindle 112a is operated in a pre-drilling process to form the initial hole 131 in the workpiece 130. As the operative head 116 of the first spindle 112a is operated to form the initial hole 131, the lubricant dispenser 126 is operated to dispense the lubricant 128 onto the operative head 116 and into the initial hole 131, in order to lubricate and cool the operative head 116 and the initial hole 131. During this time, the valve 124 is in the open position, and the vacuum generator 125 is activated. As such, lubricant 128 and debris 171 is drawn through the vacuum gate 122 into the vacuum generator 125.

Figure 8:
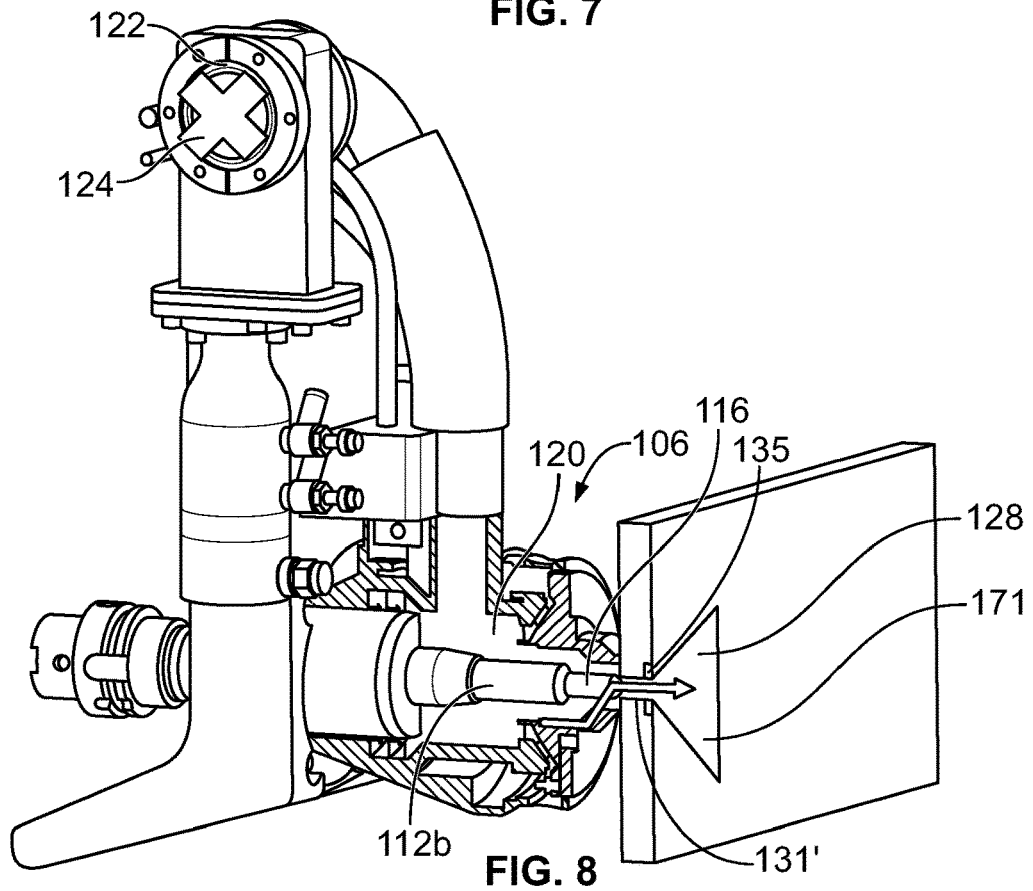
FIG. 8 illustrates a perspective, partial cross-sectional view of the end effector having a second spindle in an operating position, according to an embodiment of the present disclosure.

FIG. 8 illustrates a perspective, partial cross-sectional view of the end effector 106 having a second spindle 112b in an operating position, according to an embodiment of the present disclosure. Referring to FIGS. 1 and 8, after the initial hole 131 is formed, the first spindle 112a is moved back to a stowed position within the internal chamber 109 of the housing 108, and the second spindle 112b is moved into the operating position. The second spindle 112b is operated in a tapering process to modify the initial hole 131 to form the tapered hole 131'. During this time, the valve 124 of the vacuum gate 122 is closed, so that fluid is not drawn through the vacuum gate 122 to the vacuum generator 125. At the same time, the lubricant dispenser 126 continues to dispense the lubricant 128 onto the operative head 116 and into the tapered hole 131'. Due to the sealing interface between the seal 134 and the main body 114, as well as the valve 124 being closed, the fluid pressure builds within the internal cavity 120, thereby causing the lubricant 128 and any debris 171 caused by the drilling process to be ejected out of the tapered hole 131' opposite from the end effector 106. In this manner, excess lubricant 128 and debris 171 is automatically cleared from the end effector 106 and the tapered hole 131'.

If the third spindle 112c is to be used, the end effector 106 is operated as shown and described with respect to FIG. 7, in which the valve 124 is in the open position. After operation of the third spindle 112c, the valve 124 may be closed, and lubricant 128 and debris 171 may be ejected through the hole 131 as shown and described with respect to FIG. 8.

Figure 9:
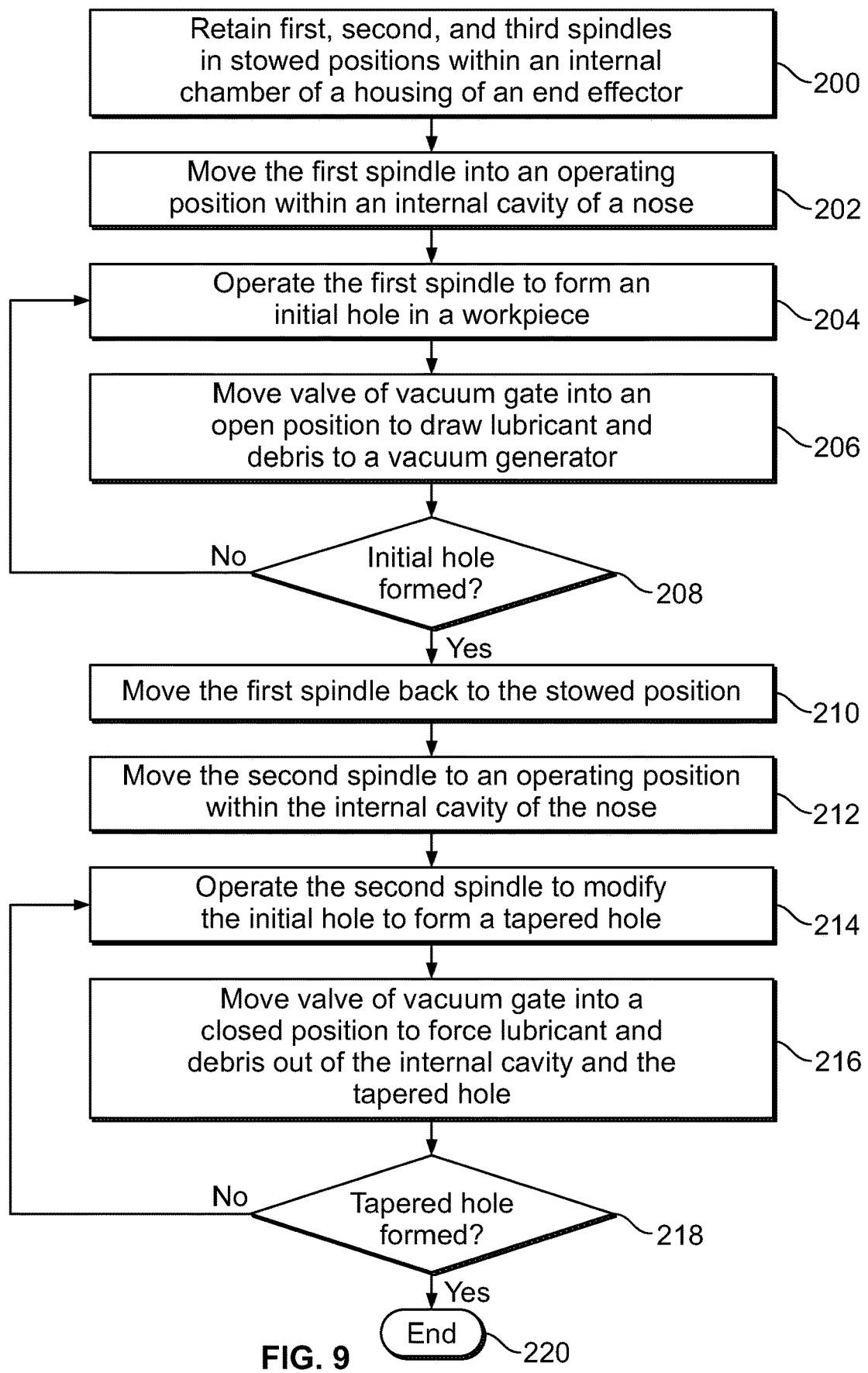
FIG. 9 illustrates a flow chart of a robotic forming method, according to an embodiment of the present disclosure.

FIG. 9 illustrates a flow chart of a robotic forming method, according to an embodiment of the present disclosure. Referring to FIGS. 1 and 9, the control unit 136 is configured to operate the robotic forming system 100, such as according to the flow chart shown in FIG. 9.

At 200, first, second, and third spindles 112 (such as the spindles 112a, 112b, and 112c shown in FIG. 5) are retained in stowed positions within the internal chamber 109 of the housing 108 of the end effector 106. At 202, the first spindle 112a is moved into an operating position within the internal cavity 120 of the nose 110. At 204, the first spindle 112a is operated to form the initial hole 131 in the workpiece 130. At 206, the valve 124 of the vacuum gate 122 is moved into an open position to draw lubricant and debris to the vacuum generator 125.

At 208, it is determined if the initial hole 131 is fully formed. If not, the method returns to 204.

If, however, the initial hole 131 is formed, the method proceeds from 208 to 210, at which the first spindle 112a is moved back to the stowed position. At 212, the second spindle 112b is then moved to an operating position within the internal cavity 120 of the nose 110. At 214, the second spindle 112b is operated to modify the initial hole 131 to form a tapered hole 131' (shown in FIG. 8). At 216, the valve 124 of the vacuum gate 122 is moved into a closed position, thereby closing the vacuum gate 122, and forcing, via built fluid pressure, lubricant and debris out of the internal cavity 120 and the tapered hole 131'.

At 218, it is determined if the tapered hole 131' is fully formed. If not, the method returns to 214. If, however, the tapered hole 131' is fully formed, the valve 124 may be reopened, the vacuum generator 125 may be deactivated, the second spindle 112b may be moved back to the stowed position, and the method may otherwise end at 220. Optionally, the third spindle 112c may be moved into the operating position to form a countersink 135 (shown in FIG. 8) or counterbore in the tapered hole 131'.

Figure 10:
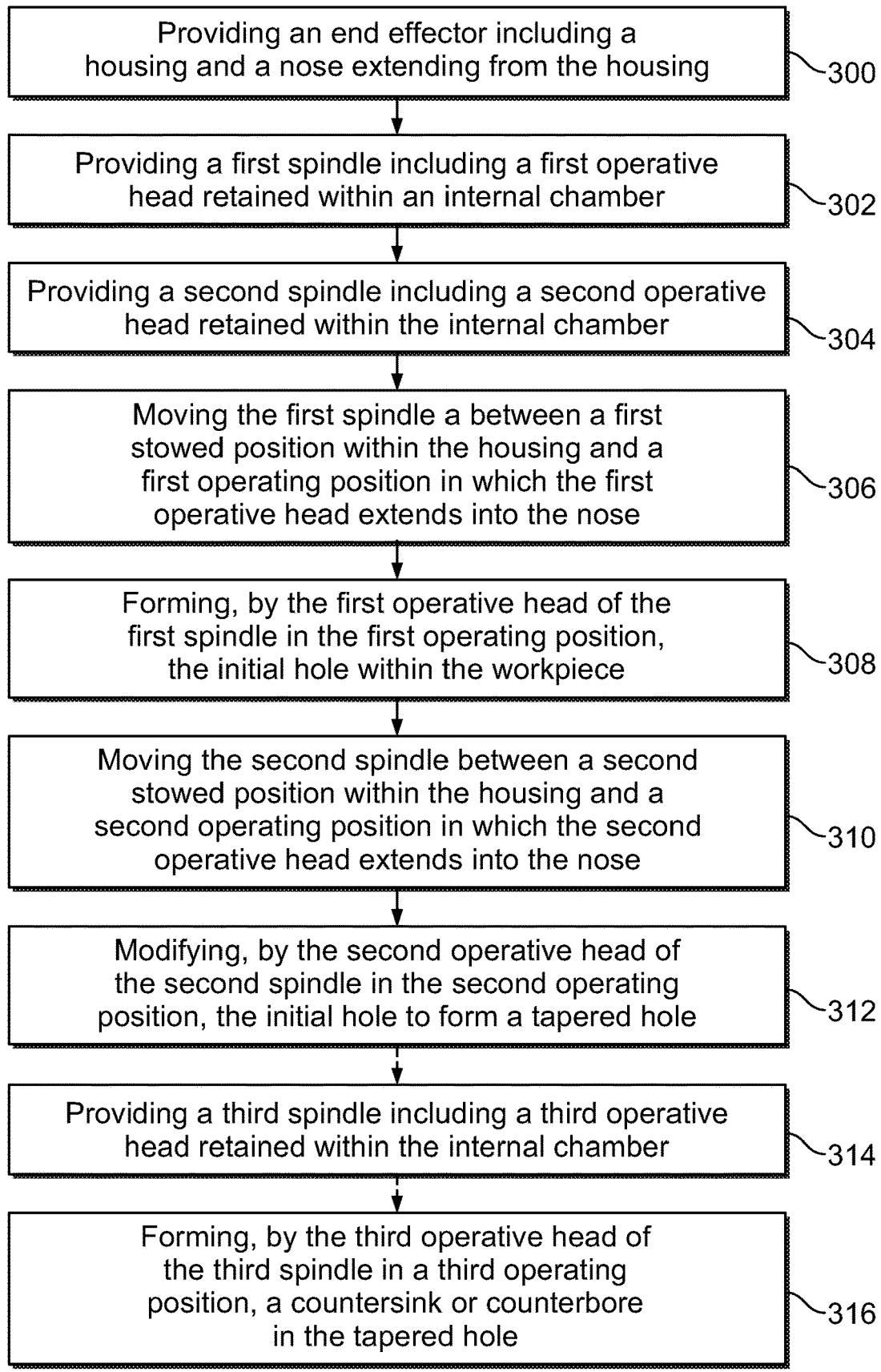
FIG. 10 illustrates a flow chart of a robotic forming method for forming a tapered hole in workpiece, according to an embodiment of the present disclosure.

FIG. 10 illustrates a flow chart of a robotic forming method for forming a tapered hole in workpiece, according to an embodiment of the present disclosure. In at least one embodiment, a robotic forming method for forming a tapered hole in the workpiece 130 includes, at 300, providing the end effector 106 including the housing 108 and the nose 110 extending from the housing 108. The housing 108 defines the internal chamber 109. The robotic forming method also includes, at 302, providing the first spindle 112a including a first operative head 116 retained within the internal chamber 109. The robotic forming method also includes, at 304, providing the second spindle 112b comprising a second operative head 116 retained within the internal chamber 109. The robotic forming method also includes, at 306, moving the first spindle 112a between a first stowed position within the housing 108 and a first operating position in which the first operative head 116 extends into the nose 110. The robotic forming method also includes, at 308, forming, by the first operative head 116 of the first spindle 112a in the first operating position, the initial hole 131 within the workpiece 130. Next, the robotic forming method includes, at 310, moving the second spindle 112b between a second stowed position within the housing 108 and a second operating position in which the second operative head 116 extends into the nose 110. The robotic forming method also includes, at 312, modifying, by the second operative head 116 of the second spindle 112b in the second operating position, the initial hole 131 to form a tapered hole 131'. Optionally, the robotic forming method also includes, at 314, providing a third spindle 112c comprising a third operative head 116 retained within the internal chamber 109, and, at 316, forming, by the third operative head 116 of the third spindle 112c in a third operating position, a countersink or a counterbore in the tapered hole 131'.

In an example, the robotic forming method also includes fluidly coupling the vacuum gate 122 with the internal cavity 120 of the nose 110, coupling the vacuum generator 125 to the vacuum gate 122, disposing the valve 124 within the vacuum gate 122, and selectively moving the valve 124 between an open position that allows for fluid communication with the vacuum generator 125, and a closed position that prevents fluid communication with the vacuum generator 125.

In an example, the robotic forming method also includes activating the vacuum generator 125, moving the valve 124 into the open position when the first operative head 116 is in the first operating position, and drawing lubricant 128 and debris 171 to the vacuum generator 125 through the vacuum gate 122 when the valve 124 is in the open position.

In an example, the robotic forming method also includes moving the valve 124 into the closed position when the second operative head 116 is in the second operating position, and forcing lubricant 128 and debris 171 out of the internal cavity 120 of the nose 110 and the tapered hole 131' when the valve 124 is in the closed position.

In an example, the robotic forming method also includes providing the lubricant dispenser 126 within the nose 110, and dispensing, by the lubricant dispense 126r, lubricant 128 onto one or more of the first operative head 116 in the first operating position, the second operative head 116 in the second operating position, the initial hole 131, or the tapered hole 131'.

In an example, the robotic forming method also includes providing the seal 134 within the nose 110, and sealingly engaging, by the seal 134, the first spindle 112a in the first operative position and the second spindle 112b in the second operative position.

In an example, the robotic forming method also includes operating, by the control unit 136, the first spindle 112a and the second spindle 112b.

As described herein, embodiments of the present disclosure provide efficient and effective systems and methods of forming tapered holes through structures. Further, embodiments of the present disclosure provide automatic systems and methods of forming tapered holes through structures. Additionally, embodiments of the present disclosure provide automatic systems and methods that provide pressure to more forcefully force air and lubricant through a tapered hole during formation of the tapered hole (compared to conventional systems for forming tapered holes). Also, embodiments of the present disclosure provide systems and methods that extend the life an operating head (such as that of a drill) that is used to form tapered holes in metals.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A robotic forming system for forming a tapered hole in a workpiece, the robotic forming system comprising an end effector including:
   a housing and a nose extending from the housing, wherein the housing defines an internal chamber;
   a vacuum gate in fluid communication with an internal cavity of the nose;
   a seal within the nose;
   a first spindle comprising a first operative head, the first spindle retained within the internal chamber, wherein the first spindle is configured to be moved between a first stowed position within the housing and a first operating position in which the first operative head extends into the nose, wherein the first operative head is configured to form an initial hole within the workpiece; and
   a second spindle comprising a second operative head, the second spindle retained within the internal chamber, wherein the second spindle is configured to be moved between a second stowed position within the housing and a second operating position in which the second operative head extends into the nose, wherein the second operative head is configured to modify the initial hole to form the tapered hole.

2. The robotic forming system of claim 1, further comprising a third spindle comprising a third operative head, the third spindle retained within the internal chamber, wherein the third spindle is configured to be moved between a third stowed position within the housing and a third operating position in which the third operative head extends into the nose, wherein the third operative head is configured to form a countersink or a counterbore in the tapered hole.

3. The robotic forming system of claim 1, further comprising:
one or more arms, wherein the end effector is coupled to the one or more arms; and
one or more actuators operatively coupled to the one or more arms and/or the end effector.

4. The robotic forming system of claim 1, further comprising:
a vacuum generator coupled to the vacuum gate; and
a valve disposed within the vacuum gate, wherein the valve is configured to be selectively moved between an open position that allows for fluid communication with the vacuum generator, and a closed position that prevents fluid communication with the vacuum generator.

5. The robotic forming system of claim 4, wherein the vacuum generator is activated and the valve is in the open position when the first operative head is in the first operating position, and wherein lubricant and debris are drawn to the vacuum generator through the vacuum gate when the valve is in the open position.

6. The robotic forming system of claim 4, wherein the valve is in the closed position when the second operative head is in the second operating position, and wherein lubricant and debris are forced out of the internal cavity of the nose and the tapered hole when the valve is in the closed position.

7. The robotic forming system of claim 1, further comprising a lubricant dispenser within the nose, wherein the lubricant dispenser is configured to dispense lubricant onto one or more of the first operative head in the first operating position, the second operative head in the second operating position, the initial hole, or the tapered hole.

8. The robotic forming system of claim 7, wherein the lubricant dispenser is positioned at a tip of the nose and is configured to apply lubricant directly to each of the first operative head and the second operative head at an interface between the nose and the hole.

9. The robotic forming system of claim 1, wherein the seal is configured to sealingly engage at least a portion of the first spindle in the first operative position and the second spindle in the second operative position.

10. The robotic forming system of claim 9, wherein the seal comprises dual shaft seals mounted to an internal wall of the nose.

11. The robotic forming system of claim 1, further comprising a control unit that is configured to operate the first spindle and the second spindle.

12. A robotic forming method for forming a tapered hole in a workpiece, the robotic forming method comprising:
providing an end effector including a housing and a nose extending from the housing, wherein the housing defines an internal chamber;
fluidly coupling a vacuum gate with an internal cavity of the nose;
providing a seal within the nose;
providing a first spindle comprising a first operative head, the first spindle retained within the internal chamber;
providing a second spindle comprising a second operative head, the second spindle retained within the internal chamber;
moving the first spindle between a first stowed position within the housing and a first operating position in which the first operative head extends into the nose;
forming, by the first operative head of the first spindle in the first operating position, an initial hole within the workpiece;
moving the second spindle between a second stowed position within the housing and a second operating position in which the second operative head extends into the nose; and
modifying, by the second operative head of the second spindle in the second operating position, the initial hole to form the tapered hole.

13. The robotic forming method of claim 12, further comprising:
providing a third spindle comprising a third operative head, the third spindle retained within the internal chamber; and
forming, by the third operative head of the third spindle in a third operating position, a countersink or a counterbore in the tapered hole.

14. The robotic forming method of claim 12, further comprising:
coupling a vacuum generator to the vacuum gate;
disposing a valve within the vacuum gate; and
selectively moving the valve between an open position that allows for fluid communication with the vacuum generator, and a closed position that prevents fluid communication with the vacuum generator.

15. The robotic forming method of claim 14, further comprising:
activating the vacuum generator;
moving the valve into the open position when the first operative head is in the first operating position; and
drawing lubricant and debris to the vacuum generator through the vacuum gate when the valve is in the open position.

16. The robotic forming method of claim 14, further comprising:
moving the valve into the closed position when the second operative head is in the second operating position; and
forcing lubricant and debris out of the internal cavity of the nose and the tapered hole when the valve is in the closed position.

17. The robotic forming method of claim 12, further comprising:
providing a lubricant dispenser within the nose; and
dispensing, by the lubricant dispenser, lubricant onto one or more of the first operative head in the first operating position, the second operative head in the second operating position, the initial hole, or the tapered hole.

18. The robotic forming method of claim 12, further comprising sealingly engaging, by the seal, the first spindle in the first operative position and the second spindle in the second operative position.

19. The robotic forming method of claim 12, further comprising operating, by a control unit, the first spindle and the second spindle.

20. A robotic forming system for forming a tapered hole in a workpiece, the robotic forming system comprising an end effector including:

a housing and a nose extending from the housing, wherein the housing defines an internal chamber;

a first spindle comprising a first operative head, the first spindle retained within the internal chamber, wherein the first spindle is configured to be moved between a first stowed position within the housing and a first operating position in which the first operative head extends into the nose, wherein the first operative head is configured to form an initial hole within the workpiece;

a second spindle comprising a second operative head, the second spindle retained within the internal chamber, wherein the second spindle is configured to be moved between a second stowed position within the housing and a second operating position in which the second operative head extends into the nose, wherein the second operative head is configured to modify the initial hole to form the tapered hole;

a third spindle comprising a third operative head, the third spindle retained within the internal chamber, wherein the third spindle is configured to be moved between a third stowed position within the housing and a third operating position in which the third operative head extends into the nose, wherein the third operative head is configured to form a countersink or a counterbore in the tapered hole;

a vacuum gate in fluid communication with an internal cavity of the nose;

a vacuum generator coupled to the vacuum gate;

a valve disposed within the vacuum gate, wherein the valve is configured to be selectively moved between an open position that allows for fluid communication with the vacuum generator, and a closed position that prevents fluid communication with the vacuum generator;

a lubricant dispenser within the nose, wherein the lubricant dispenser is configured to dispense lubricant onto one or more of the first operative head in the first operating position, the second operative head in the second operating position, the third operative head in the third operating position, the initial hole, or the tapered hole; and a seal within the nose, wherein the seal is configured to sealingly engage the first spindle in the first operative position, the second spindle in the second operative position, and the third spindle in the third operative position.

21. The robotic forming system of claim 20, wherein the vacuum generator is activated and the valve is in the open position when the first operative head is in the first operating position, wherein lubricant and debris are drawn to the vacuum generator through the vacuum gate when the valve is in the open position, wherein the valve is in the closed position when the second operative head is in the second operating position, and wherein lubricant and debris are forced out of the internal cavity of the nose and the tapered hole when the valve is in the closed position.

22. A robotic forming system for forming a tapered hole in a workpiece, the robotic forming system comprising an end effector including:

a housing and a nose extending from the housing, wherein the housing defines an internal chamber;

a vacuum gate in fluid communication with an internal cavity of the nose;

a seal within the nose;

a first spindle comprising a first operative head, the first spindle retained within the internal chamber; and a second spindle comprising a second operative head, the second spindle retained within the internal chamber, wherein the second operative head is configured to modify an initial hole to form the tapered hole.

23. A robotic forming method for forming a tapered hole in a workpiece, the robotic forming method comprising:

providing an end effector including a housing and a nose extending from the housing, wherein the housing defines an internal chamber;

fluidly coupling a vacuum gate with an internal cavity of the nose;

providing a seal within the nose;

providing a first spindle comprising a first operative head, the first spindle retained within the internal chamber;

providing a second spindle comprising a second operative head, the second spindle retained within the internal chamber; and modifying, by the second operative head of the second spindle, an initial hole to form the tapered hole.

\* \* \* \* \*